United States Patent [19]
De Wolf et al.

[11] 3,772,595
[45] Nov. 13, 1973

[54] METHOD AND APPARATUS FOR TESTING A DIGITAL LOGIC FET BY MONITORING CURRENTS THE DEVICE DEVELOPS IN RESPONSE TO INPUT SIGNALS

[75] Inventors: Nicholas De Wolf, Kingston, Surry, England; John G. Turner, Boston, Mass.

[73] Assignee: Teradyne, Inc., Boston, Mass.

[22] Filed: Mar. 19, 1971

[21] Appl. No.: 126,035

[52] U.S. Cl............................................. 324/73 R
[51] Int. Cl............................................ G01r 15/12
[58] Field of Search .................. 324/73, 158; 71/11

[56] References Cited
UNITED STATES PATENTS

| | | | |
|---|---|---|---|
| 3,621,387 | 11/1971 | Smith | 324/73 |
| 3,633,100 | 1/1972 | Heilwell | 324/73 |
| 3,597,682 | 8/1971 | Hybbs | 324/73 |
| 3,599,098 | 8/1971 | McPhail | 324/73 |

OTHER PUBLICATIONS
Templeman, C., Discrete Probe, Coax Line Driver, IBM Tech. Bull., Vol. 11, No. 9, Feb. 1969, p. 1164–1165.

*Primary Examiner*—Robert J. Corcoran
*Attorney*—Kenway, Jenney & Hildreth

[57] ABSTRACT

A circuit tester examines MOS and other semiconductor logic devices at the high frequency of normal operation by measuring the current handling capability of the device. The tester performs the operation by sensing the current which the device delivers to, or draws from, a load of low resistance. The tester in one embodiment applies bursts of test data to the device under test at megaHertz rates by means of a pattern generator which allows ready adjustment of the burst length and configuration. The output detector for the tester senses the operation of the device under test as a source or sink of current.

14 Claims, 3 Drawing Figures

METHOD AND APPARATUS FOR TESTING A DIGITAL LOGIC FET BY MONITORING CURRENTS THE DEVICE DEVELOPS IN RESPONSE TO INPUT SIGNALS

BACKGROUND

This invention relates to the testing of electrical devices of the integrated circuit type and in particular of so-called MSI (medium scale integration) and LSI (large scale integration) types with metal-oxide semiconductor (MOS) construction. The invention provides test equipment and a test metnod capable of testing the dynamic operation of such devices at their normal intended operating rates, which typically are in the megaHertz range. Further, the invention makes such testing possible with test equipment connected to the device under test by a significant length, e.g., two meters, of electrical cable.

Although the test equipment and methods embodying the invention can be used to advantage with other types of electrical devices, including for example bipolar TTL logic devices, the invention finds particular application in the testing of integrated charge-storage devices such as of the MOS type and the charge-coupled type. Accordingly, the invention is described with particular reference to MOS charge-storage devices, but the scope of the invention is not limited to these particulars.

As used herein, the term "MOS device" refers to a binary digital logic circuit or a portion of such a circuit constructed with metal-oxide field effect transistors, typically by integrated circuit techniques. Typical MOS devices include shift registers, random access memories, and read-only memories. The article "Large-Scale Integration In Electronics" by F. G. Heath, Scientific American, 1970 (Vol. 222, No. 2, pp. 22 ff.) describes the construction of such electronic equipment.

MOS devices typically operate at megaHertz rates, i.e., currently at 1 to 2 megaHertz and forecast at up to 5 or 10 megaHertz, and can develop output voltage swings of 15 or more volts. Accordingly, each logic unit or stage of an MOS device is typically viewed as a voltage switch, and correspondingly the conventional testing of MOS devices seeks to measure the output voltage swings of the device. The conventional tester for this purpose has a high input impedance, as is customary in voltage-sensing instruments.

However, the capacitances normally present in the connections between the device and the measuring equipment seriously degrade the output signals being measured. Accordingly, prior art testers generally resort to one of two techniques, or both together, to minimize such capacitances. One technique is to connect the device under test with the test equipment by means of shielded cable and to drive the cable shield in such a manner that there is essentially no shunt capacity in the interconnection. The other technique is to locate the test equipment input amplifiers in very close proximity, e.g., within a few centimeters, to the device under test. Both techniques are costly to implement. They also tend to result in cumbersome equipment. This is particularly true with the latter technique. By way of example, it is often desirable to test MOS devices prior to separating them from the wafer form in which they are fabricated together with a multitude of identical devices and hence prior to connecting leads to each device. This testing of MOS devices requires the use of a test head having multiple miniature probes for contacting the device; for example, it is typical for an MOS device which occupies only 25 microns square to require a test head having as many as 60 probes to contact all the different input and output and supply terminals on the device. The tester probes are in such close proximity to each other that there is a relatively high capacitance between them and hence to ground. In an effort to minimize this capacitance, testers for this purpose heretofore have been provided with ultraminiature preamplifiers in each probe. Resort to techniques such as this are costly.

The shortcomings that hence plague conventional MOS testers are well known, as discussed for example in the article "A Critique Of MOS/LSI Testing" by M. A. Robinton, Electronics, 1 Feb. 1971, pp. 62–64.

Accordingly, it is an object of this invention to provide test equipment and a test method for integrated semiconductor binary logic apparatus and which is capable of testing at the full operating rate of the apparatus with comparatively little concern for shunt capacitance at the input of the tester or in the connection between the test equipment and the apparatus under test.

Another object is to provide test equipment and a test method of the above character which performs a mode of testing that is relatively unaffected by the aforementioned shunt capacitances.

A particular object of the invention is to provide a test instrument and method of the above character capable of testing the dynamic operation of metal-oxide integrated semiconductor devices with binary test signals applied at a megaHertz rate.

A further object of the invention is to provide test equipment and a method of the above character which can be implemented at relatively low cost.

It is also an object of the invention to provide test equipment and a method of the above character capable of testing semiconductor apparatus under different selected load conditions.

A further object of the invention is to provide comparatively low-cost electronic equipment for producing a serial succession of binary signals of selective length and at a relatively high, typically megaHertz, rate. It is also an object to provide such equipment which functions as a pattern generator for an electronic logic tester and which can receive the test signals at a rate which is slow compared with the rate at which it applies it to apparatus being tested.

Other objects of the invention will in part be obvious and will in part appear hereinafter.

The invention accordingly comprises the features of construction, combinations of elements, and arrangement of parts exemplified in the constructions hereinafter set forth, and the several steps and the relation of one or more of such steps in respect to each of the others according to which the elements and parts operate, and the scope of the invention is indicated in the claims.

GENERAL DESCRIPTION

In accordance with one embodiment of the invention, test equipment for MOS and other charge-storage devices presents a low resistive impedance to each terminal on the device under test at which a signal is to be tested. The test equipment senses the current which the device under test delivers to each such resistive element in response to test signals applied to the device.

With this arrangement, the impedance of each resistive element is readily made sufficiently less than the shunt impedance of whatever capacitances are presented to the monitored terminals of the device under test, even at the megaHertz or other like high operating frequency of the device. As a result, whatever stray capacitances are present at the input of the test equipment and/or in the interconnection between the test equipment and the device under test, such as a meter or so of interconnecting cable, do not significantly degrade the test performance.

Expressed in another way, the rate of voltage change which the device under test develops across the low resistive impedance element which the tester presents to each device terminal being monitored is sufficiently small so that the stray or shunt capacitances loading these device terminals do not draw significant current. Instead the device output current is delivered to each resistive impedance element of the test equipment without significant degradation due to capacitive loading.

Thus, the invention provides equipment and procedures for testing metal-oxide semiconductor and other integrated logic devices not as voltage switches, which has heretofore is conventional, but rather as current sources and/or sinks. It is considered that this different mode of testing is at least equally as revealing of the performance of the device under test as is the conventional voltage-switch testing mode. In addition, a tester embodying the invention can be connected to unpackaged MOS and other LSI and MSI devices, i.e., in the wafer state of fabrication, by means of a cluster of contacts connected to the test equipment through a significant length of cable, typically around a meter in length, and still test the device at its megaHertz or other like high operating speed.

The freedom from concern with shunt interface capacitances, i.e., shunt capacitances in the interconnection between the terminals of the device under test which are being monitored and the active circuits of the test equipment, which the invention provides thus removes both the need for driven-shield interconnections between the device and the tester, and the need for tester constructions that essentially avoid lengths of interconnecting conductors. As a result, the test equipment and procedures of the invention are less costly to employ than prior art equipment. Also, due to the ease in connecting the tester of this invention to the device under test, the invention avoid the cumbersome and awkward test configurations of many prior art testers.

BRIEF DESCRIPTION OF DRAWINGS

For a fuller understanding of the nature and objects of the invention, reference should be had to the following detailed description taken in connection with the accompanying drawings, in which.

DESCRIPTION OF ILLUSTRATED EMBODIMENTS

Figure 1:
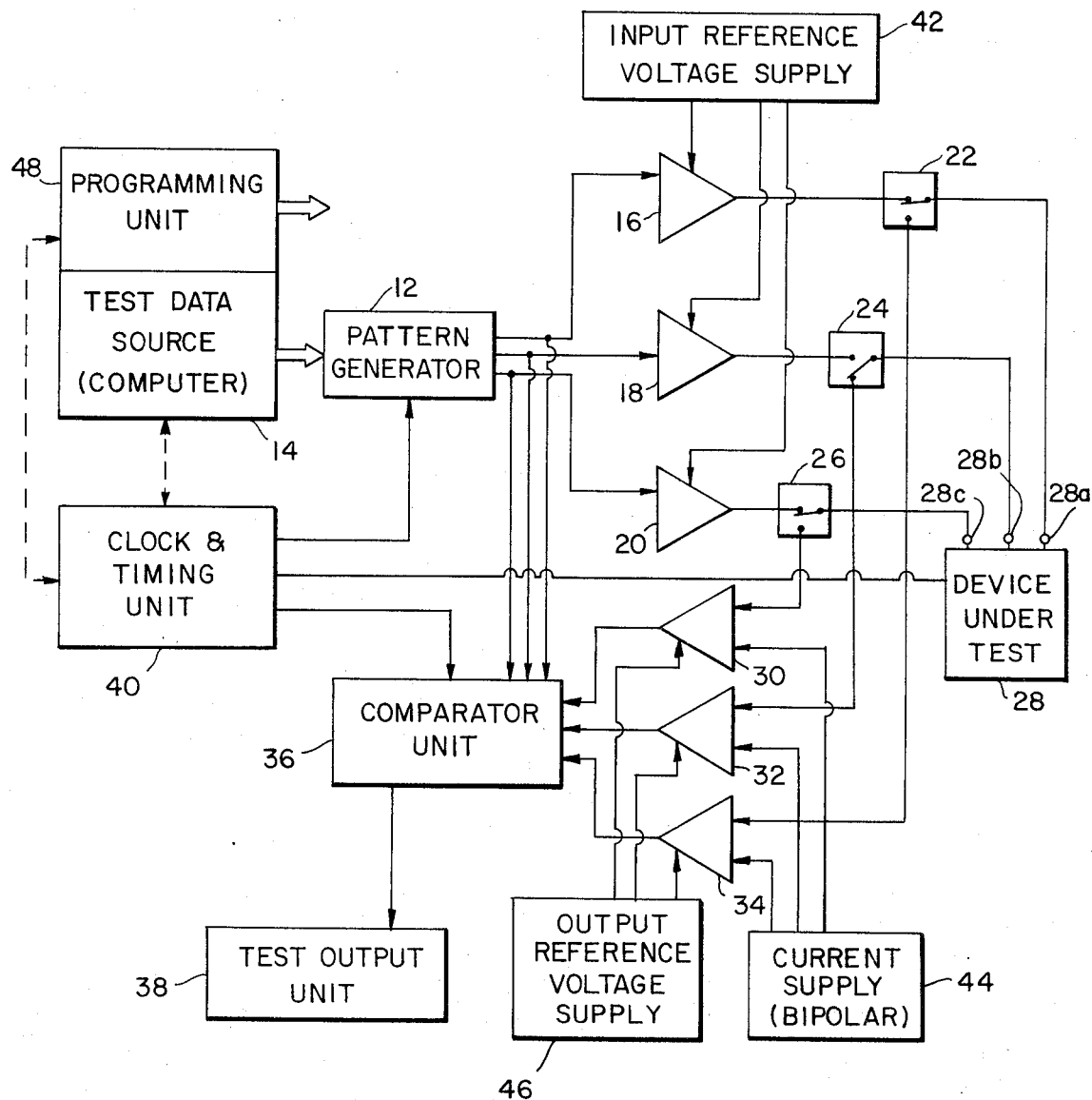
FIG. 1 is a block schematic representation of binary logic tester embodying the invention.

As shown in FIG. 1, a tester embodying the invention has a pattern generator 12 that receives test data from a source 14, typically a programable general purpose computer, and applies it by way of one or more data drivers 16, 18 and 20 and switch devices 22, 24 and 26 to selected terminals 28a, 28b and 28c of a device 28 under test. One or more of the switch devices 22, 24, 26 apply the resultant signals which the device under test develops at these and/or other of its terminals to output detector buffers 30, 32 and 34, which in turn apply test output signals to a comparator unit 36.

The comparator unit, which also receives the input test data from the pattern generator 12, operates a test output unit 38 in response to a comparison of the logic conditions which the test input data and the corresponding test output signals identify.

The tester has a clock and timing unit 40 for controlling the timing of the tester operation. Also, an input reference voltage supply 42 is provided to enable selection of the desired voltage levels of the test data applied to the device under test 28. In addition, a bipolar current supply 44 and an output reference voltage supply 46 connect to each buffer 30, 32, 34 to provide varied output load conditions under which the device 28 can be tested.

As also shown in FIG. 1, a programing unit 48 establishes operating parameters for the pattern generator 12, for the switch devices 22, 24, 26, and for the supplies 42, 44 and 46. It typically also connects with the clock and timing unit 40 for synchronizing the operation of the two units 48 and 40. The computer that functions as the test data source 14 can also function as the programing unit 48. However, whatever construction is used for the programing unit 48, it typically operates each switch device 22, 24 and 26 to apply either the signal from the data driver connected therewith to the device under test or to apply the signal at a device terminal to an output detector buffer, or to make both connections in a selected time sequence during each cycle of the tester operation.

To provide this operation, each switch device 22, 24 and 26 is functionally a single-pole, double-throw switch as indicated. Each switch device can be constructed as a relay or the like, but preferably employs semiconductor circuits with a speed of operation comparable to that of the device under test. This latter construction enables the switch device 26, for example, to apply a test input signal from data driver 20 to device terminal 28c and then to switch so as to apply to buffer 30 the signal that appears at this device terminal later in the same cycle of testing operation.

The programing unit 48 also operates each supply 42, 44 and 46 to produce a desired voltage or current level. Thus, the programing unit operates the input reference voltage supply 42 to apply the test input data to the device 28 under test with a selected voltage for each binary condition of the input signals.

Each data driver 16, 18 and 20 of FIG. 1 is essentially a buffer amplifier which receives binary signals in sequence from the pattern generator 12 and applies signals with the same logic to the device under test at voltage levels established with the input reference voltage supply 42. The tester comparator unit 36 compares the logic condition of the test output signals it receives from one or more of buffers 30, 32 and 34, at a time in each cycle of the test sequence as determined by timing signals it receives from the clock and timing unit 40, with the applied test data output from the pattern generator 12. The test output unit 38 processes the result of this comparison in whatever manner is desired, according to known practices.

The arrangement of the clock and timing unit 40 is selected according to the test which is to be performed. By way of example, in a typical test sequence, the unit 40 operates the supplies 42, 44 and 46 to set up testing parameters and actuates the switch devices 22, 24 and 26 as desired for the test. In an illustrative test where the device 28 terminal 28a is to be treated as an input terminal, the terminal 28b as an output terminal, and the terminal 28c first as an input terminal and then as an output terminal, switch device 22 is actuated to connect the driver 16 with the device 28, switch device 24 is actuated to connect the buffer 32 to terminal 28b, and switch device 26 is operated in each cycle of the test sequence first to connect driver 20 to the terminal 28c and then to apply the signal at this terminal to buffer 30. The clock and timing unit 40 also operates the test data source 14 and/or the pattern generator 12 to assemble in the pattern generator the word of test data to be applied to the terminal 28a and the word of test data to be applied to the terminal 28c. Thus, in the example being described, the pattern generator is loaded with two words of test data, both of the same bit length, and will apply successive bits of each of the two words to the data drivers 16 and 20 in each cycle of the operating sequence.

After the tester is set up for this operation, the clock and timing unit 40 initiates the sequence of test cycles, each of which typically is one microsecond in duration so that the sequence proceeds at a one megaHertz rate. In each cycle, the pattern generator 12 applies the nest successive bit of each test data word which it stores to the data drivers 16 and 20 and to the comparator unit 36. The clock and timing unit 40 also actuates the device under test with timing signals at selected intervals, typically less than the cycle time, and, for the purpose indicated above, changes the condition of the switch device 26. Also at a selected interval during each cycle, the timing unit 40 actuates the comparator unit 36 to compare the test output signals it is receiving at that time from the buffers 30 and 32 with the test data from the pattern generator. (The buffer 34 is not being used in this illustrative operation inasmuch as the device terminal 28a is functioning throughout the test as an input terminal only). The result of the comparison made in each cycle of the test sequence is applied to the test output unit 38.

Figure 2:
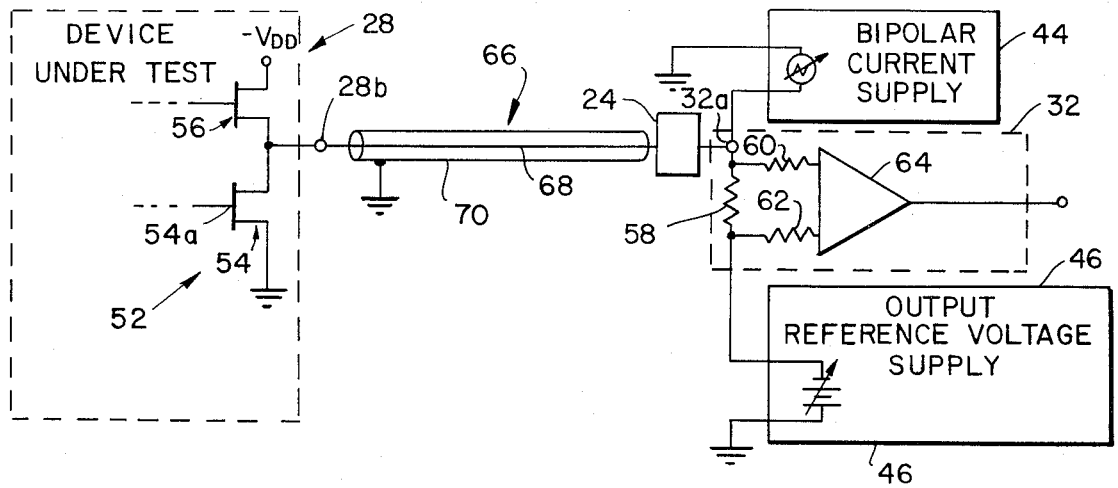
FIG. 2 is a schematic representation, partly in block form, of an output detector buffer embodying features of the invention and for use in the tester of FIG. 1.

A device 28 typical of those tested with the instrument of FIG. 1 has, at each output terminal such as terminal 28b, an output stage 52 as shown in FIG. 2. The illustrated output stage has a field effect transistor 54 which receives, from within the device 28, a binary control signal at its gate 54a. One value of this control signal typically drives the transistor 54 to develop a sink-drain resistance of approximately 10 megohms; and the other value of the gate control signal typically drives the transistor to develop a sink-drain resistance in the order of 200 to 500 ohms or less. The field effect transistor 54 receives current from a supply of voltage $V_{DD}$ (typically −15 volts DC) through another field effect transistor 56 which the device typically drives to develop a sink-drain resistance of 40,000 ohms. With this arrangement, the open circuit output voltage at the interconnection between transistors 54 and 56, which is the device output terminals 28b, switches nearly between the supply voltage $V_{DD}$ and ground, e.g., swings nearly 15 volts when the gate drive to transistor 54 changes from one binary value to the other. This relatively large voltage swing is easy to detect and measure with a detector having a high input impedance, as is conventionally used, provided there is no shunt capacitance loading the signal path between the device terminal 28b and such a detector. As discussed above, any such capacitance seriously degrades the device output signal which the conventional voltage detector of high input impedance receives, due to the megaHertz or like high speed rate at which the device output signal changes. As further noted above, it has been difficult in the prior art to avoid such capacitances and hence it has become increasingly difficult to test logic circuits and other devices operating at these high speeds.

The invention solves this problem by providing the output detector buffer as a current sensor with a low input resistance between its input terminal 32a and ground. Theoretically, this input resistance can be essentially a short circuit, although the practical construction of a current sensor generally requires a finite input resistance.

The illustrated buffer 32, which is typical of the other buffers 30 and 34 of the FIG. 1 tester, senses the device 28 output current at terminal 28b by passing the current through an input resistor 58 of unusually low value, for example 200 ohms, and sensing the resultant voltage across the resistor 58. Resistors 60 and 62, of relatively high value in the range of 1,000 ohms, apply the voltage that develops across the low input resistor 58 to the active amplifier portion 64 of the buffer 32. This buffer portion 64 has a high input impedance, for example in the order of one megohm. The resistors 60 and 62 protect this buffer portion from damage by an excessive current such as might occur in the event the two ends of the resistor 58 are inadvertently shorted together or one is accidentally shorted to ground.

As also shown in FIG. 2, an interconnection 66, typically a conductor 68 either without a shield or within a grounded shield 70 as illustrated, connects the device output terminal 28b to the buffer input terminal 32a, to which one end of resistor 58 is connected. The switch device 24 of FIG. 1, where used, is interposed between the interconnection 66 and the terminal 32a, as shown.

The connection of the current supply 44 of FIG. 1 with the buffer 32 is such that it is effectively between ground and the terminal 32a. The supply thus presents a high impedance typical of current supplies to ground from the terminal 32a, but delivers to the terminal 32a whatever positive or negative current the supply is set to produce. The connection of the FIG. 1 output reference voltage supply 46 to the buffer 32 is such that it is effectively between the other resistor 58 terminal and ground. Hence it applies whatever voltage the supply is set to produce to this resistor terminal, with the theoretically zero resistance of voltage supplies between that terminal and ground. With this arrangement, the resistance to ground from the buffer input terminal 32a is essentially the resistance of resistor 58, which as stated is relatively low, typically with a value of less than 500 ohms.

With such a low and resistive input impedance to the buffer 32, the output signals which the device 28 develops at its terminal 28b appear with essentially identical waveform across the resistor 58 and hence at the input to the output detector buffer. This is because with the small input resistor to the buffer, the time constant of this resistor and the shunt capacitance in the interconnection 66 is readily maintained small, even relative to the nanosecond switching times of the output signals which the device 28 typically produces when operating at its normal speed.

For example, where the tester of FIG. 1 is to measure the performance of a device 28 which produces 50 nanosecond output pulses, the RC time constant of an interconnection 66 having a shunt capacitance (to ground) of as much as 100 picofarads is only 20 nanoseconds with a 200 ohm buffer input resistance 58. Thus, the current-sensing test of the invention makes it possible to maintain this RC time constant at least no longer than the period of the signals being monitored and usually at a small fraction of this period.

Consequently, the interconnection 66 of FIG. 2 is no longer required to be as short as a few centimeters at most as in the prior art, but can be in the order of 1 meter or more. In fact, the tester of the invention can test the performance of MOS devices which are maintained at elevated temperatures in an oven and which are connected to the tester by 4 meters of cable. Another benefit which the invention provides is that the noise signals coupled to each interconnection conductor 68, typically from other interconnections, decay at such a rapid rate that they have essentially no effect on the test quality.

The buffer 32 input resistance in accordance with the invention is at least one order of magnitude less than the maximum output impedance of the device 28 output stage 52 which the buffer is measuring. The illustrated output stage 52 develops its maximum output impedance when the transistor 54 is in the off condition, so that the stage output impedance is essentially the source-to-drain impedance of the transistor 56 therein. As noted above, this typically is in the order of 40,000 ohms, and accordingly the maximum value of the input impedance for the buffer 32 should not exceed 4,000 ohms. However, an input impedance two orders of magnitude less than the maximum output impedance of the device 28 is even more preferable, i.e., a value of 400 ohms or less. The minimum value of the buffer input impedance is determined largely by the construction used for the buffer. For the illustrated construction, a resistor 58 with a value significantly under 100 ohms generally is undesirable because the current available to it from the device is so small that the resultant voltage across the resistor 58 becomes too small to detect with accuracy and precision. This is particularly true where noise signals are likely to be present at the input to the buffer 32. Accordingly a resistor 58 of 200–500 ohms is preferred for the illustrated construction.

With further reference to FIG. 2, the provision of the bipolar current supply 44 and of the output reference voltage supply 46 enable the tester of FIG. 1 to measure a variety of device 28 operations, and over a wide range of parameter values, with a relatively simple and limited-range buffer 32.

In general, the supplies 44 and 46 introduce currents and voltages to offset the device 28 output voltages and currents at its terminal 28b. By way of example, assume that buffer 32 provides the desired operation only when the current in the input resistor 58 has a value between zero and 1 milliampere. As a first illustration with this example, where the device 28 under test is to sink 3.5 milliamperes of current when the transistor 54 therein is off, bipolar current supply 44 is set to deliver 3 milliamperes of current to the buffer 32. If the output transistor 54 of the device 28 has the desired high impedance desired for the off condition, the device will sink this current through transistor 56 to the supply of voltage $V_{DD}$ and will draw an additional ½ milliampere through the buffer resistor 58. This value of current in the resistor 58 is within the preferred range of buffer operation and hence can be measured with the desired accuracy.

As a second illustration, assume that the tester is to determine whether the device 28 will draw no current from a load which is at the same voltage as the supply voltage $V_{DD}$. For this operation, the output reference voltage supply is set to apply to the buffer 32 a voltage equal to the supply voltage $V_{DD}$, and the bipolar current supply is set to deliver zero current to the buffer. The tester is programed to sense whether there is zero current in the buffer resistor 58 when the transistor 54 of the device is in the off condition. Alternatively, where it is desired to test a device to see whether it draws zero output current when the transistor 54 is on, the supply 46 is set to apply a voltage to the buffer 32 equal to the voltage which the device 28 is prescribed to develop at its output terminal 28b when transistor 54 is on.

The detector buffer 32 thus senses the current sinking the sourcing capability of the device under test under either or both the logic ONE and logic ZERO states of the device. Further, the buffer presents a resistive impedance to the device 28 which is small relative to at least the larger output impedance of the device. Depending on the construction selected for the current-sensing buffer, this resistance in addition can be small relative to the lower value of the device output impedance. This mode of testing MOS devices can, as illustrated in FIG. 2 with the provision of the bipolar current supply 44 and reference voltage supply 46 in conjunction with the current-sensing buffer, test the current-handling capability of the MOS device with selected different current and voltage conditions presented to it. The invention enables this mode and manner of testing to be performed at the normal operating frequencies of not only present-day MOS devices but also at the higher rates contemplated for such devices.

Figure 3:
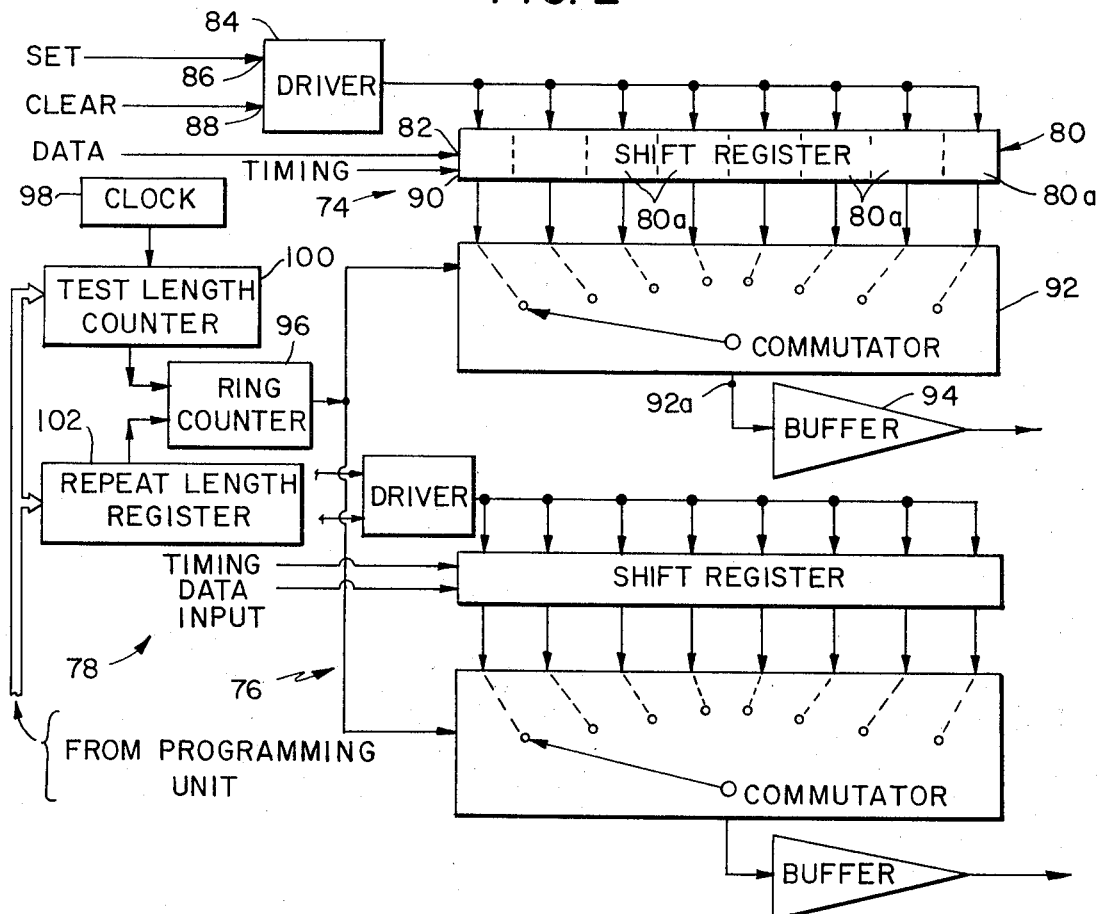
FIG. 3 is a schematic diagram, in block form, of a pattern generator embodying features of the invention and for use in the tester of FIG. 1.

With reference now to FIGS. 1 and 3, the pattern generator 12 of the illustrated tester stores a test data word for each device terminal that is to receive test signals. The pattern generator thus has a separate stage for each test data word it is to send to the device under test. In successive cycles of a testing sequence, the generator applies successive bits from each word to the data drivers 14, 18 and 20. To test the device 28 at a megaHertz rate, the generator must apply successive bits of the data words to the drivers at a corresponding, and typically equal, rate.

FIG. 3 shows two stages 74 and 76 and the control section 78 of a preferred construction which the invention provides for the pattern generator 12. Stage 74 has a register 80, illustratively a shift register having eight stages 80a and with an input terminal 82 for receiving bits of a data word in serial succession, as from the test data source 14 of FIG. 1. The stage 74 can thus be loaded with a test data word at any rate up to the maximum shift rate of its register 80.

In addition, bistable driver 84 having two input terminals 86 and 88 can as illustrated be provided to place all the shift register stages 80a in the same logic state according to the signals at its terminals 86 and 88 when the shift register receives a timing signal on an input terminal 90. Thus, when the driver 84 receives an assertion signal at its set input terminal 86 and the shift register receives a timing signal on terminal 90, the driver 84 places all the shift register stages in the set or ONE state. In the same manner, an assertion signal at the clear input terminal 88 of the driver coincident with a timing signal at the register terminal 90, places all the register stages in the clear or ZERO state.

The shift register stages 80a are connected to transfer the binary digits stored therein in parallel to a commutator 92. The commutator output terminal 92a is connected to a buffer amplifier 94, which produces the pattern generator output signal for the stage 74.

The commutator 92, indicated functionally as a single-pole, multiple-throw switch, is of electronic construction and applies to the buffer 94 the logic signal at whichever input terminal (to the commutator from the shift register) the count which the commutator receives from a ring counter 96 identifies. Thus, when the ring counter applies the binary count 0000 to the commutator 92, the commutator applies the bit from the leftmost stage 80a to buffer 94, and the commutator responds to a ring counter count of 0010 to apply to the buffer 94 the bit received from the stage 80a which is third from the left. The commutator is capable of switching with sufficient speed to apply the bits at different input terminals to the buffer at the rate at which the FIG. 1 tester is to apply test data to the device 28 under test.

The other pattern generator stage 76, and whatever other additional stages the pattern generator has, are each identical to the stage 74. The illustrated pattern generator control section 78 operates all the stages identically and concurrently, although additional gating can be included in the control section to operate the different pattern generator stages differently, where this is desired. The control section has a clock 98, or other source of timing signals such as the FIG. 1 clock and timing unit 40 produces, and which increments a test length counter 100 once in each cycle of tester operation until the counter has advanced to the count value set therein, at which point the counter 100 automatically stops incrementing. Each time it is incremented, the counter 100 increments the ring counter 96, thereby advancing the count applied to the commutator in each stage of the pattern generator. The pattern generator control section also has a repeat length register 102. This register controls the number of counts through which the ring counter 96 increments before automatically resetting and starting another counting sequence.

The test length counter 100 and repeat length register 102 receive control signals from a control device such as the tester programing unit 48 of FIG. 1.

In a specific illustrative operation of the pattern generator for use in the tester of FIG. 1, the programing unit 48 resets the test length counter 100 to zero and sets the count value at which this counter is to stop incrementing, and loads the repeat length register 102 with the count value at which the ring counter 96 is to recirculate, i.e., automatically reset to zero and continue its counting sequence from there. Thereafter, and when the shift register in each pattern generator stage is loaded with the desired test word, the pattern generator clock 98 (or the control and timing unit 40 of FIG. 1) commences incrementing the test length counter 100 by one count for each cycle of the test sequence. This causes the counter 100 to increment the ring counter 96 by one count at the same rate and this in turn actuates each pattern generator commutator to apply another bit of the data word stored in the associated shift register to the buffer in that pattern generator stage. When the ring counter 96 has advanced to the count stored in the repeat length register 102, it increments next to the zero count and then to the first count thereabove, etc. This operation continues until the test length counter is incremented to the count value preset therein, at which point the desired test sequence has been completed, and the pattern generator correspondingly halts.

By way of specific example with a pattern generator having an eight-bit shift register in each stage as illustrated for the FIG. 2 register 80 of stage 74, when the ring counter 96 is initially preset to zero, the repeat length register 102 is set to eight, i.e., loaded with the eighth binary count 111, and the test length counter 100 is zeroed and set to stop at a count value of 12, the pattern generator control section 78 operates the generator stages to increment the commutator therein across all eight shift register stages and then across the four lower-numbered (leftmost) stages. In this manner, each pattern generator stage produces a 12-bit sequence of binary test signals at the rate at which the clock 98 increments the test length counter 100. Accordingly, the pattern generator control section 78 thus operates the generator stages to test the device under test with a 12-bit burst of test data signals; the test signals from the several stages are applied to the device under test in parallel.

In the event that the repeat length register 102 is preset to a count of four, rather than eight as in the preceding example, the pattern generator again produces a 12-bit burst of test data, but the ring counter operates each commutator to increment through only for four lower-numbered stages and then to repeat this operation three times, i.e., until the test length counter is incremented to the preset counter 100 value of 12.

It will now be understood that the pattern generator shown in FIG. 3 and described above can be constructed with relatively short shift registers, such as the register 80 in stage 74. Each other component of the pattern generator, i.e., the counters 96 and 100, the register 102, and the commutators 92, similarly requires only a relatively short bit capacity. Yet the complete pattern generator can produce an essentially endless variety of high-speed bursts of test signals of any selected length according to the maximum capacity of the test length counter 100.

The burst-type pattern generator thus provided by the invention is generally significantly lower in cost than pattern generators heretofore used, particularly for logic testing such as the FIG. 1 tester performs. Further, the burst pattern generator requires relatively few control and operating signals. Also, because each shift register therein is of short length, little time is required to load a new test data word.

In addition to the test equipment set forth above, the invention provides, with the operation of this equipment, a method for testing electronic digital logic devices of the charge-storage type. As described, the device under test typically has a plurality of logic terminals, in addition to terminals for supply voltages and/or currents, and responds to binary signals applied to a first set of the logic terminals to develop binary signals at a second set of these terminals. As described with reference to FIG. 1, the two sets can overlap, i.e., include common terminals. Also, the device normally develops, at each terminal of the second set, one of two impedance levels in correspondence with the value of the binary signal which it develops there.

The test method which the invention provides includes applying a set of binary input signals in parallel to the first set of terminals of the device under test, and applying successive sets of such signals to the device at a rate typically in the megaHertz order. A further step is to sense the magnitude of the current which the device under test develops at each terminal of the second set in response to each such set of input signals, and to produce a binary test signal in response to each such sensed current. As described above with reference to FIG. 2, the current which is sensed can be of either polarity, i.e., the method of the invention tests both the current sinking and the current sourcing capability of the device under test. A further step is to compare the logic of the input signals in each set thereof with the logic of the test signals produced from the sensed currents, and to produce a test output signal according to the value of the comparison resultant. The test output signal can be produced from the comparison made from each set of input signals, or as the result of a sequence of such comparisons.

Further in accordance with the invention, the step of sensing each current which the device under test develops at each terminal in the second set thereof involves presenting to each such terminal an impedance having a resistive component with a maximum value which is at least one order of magnitude, and preferably at least two orders of magnitude, less than the larger impedance level which the device under test normally develops at that terminal. Further, this impedance has an RC time constant, computer with this resistance, which is, at the most, not greater than the period corresponding to the rate at which successive sets of the input signals are applied to the device under test. The currents which the device under test produces can be sensed as the currents which the device applies to the resistive elements which constitute these resistive impedance components, as by measuring the voltages across them. The invention can, however, be practiced with other current-sensing techniques and constructions.

The test method of the invention further comprehends applying the successive sets of parallel binary input signals to the device under test with the following sequence, which the pattern generator of FIG. 3 provides. This operating sequence enables a set of relatively short test words to form relatively lengthy sequences of the test input signals. In accordance with this sequence, for each first-set terminal of the device under test which is to receive test signals, a test word of ordered binary digits is assembled. A byte consisting of a number of successively ordered digits of the word, up to and including the entire word, is then selected. In each cycle of test operation, the next successive binary digit of this byte is applied to the device under test. The digits of the byte are applied to the device, in repeating succession, for whatever number of cycles — whether 2, $2^4$ or $2^{16}$ — it is desired to continue the test.

It will thus be seen that the objects set forth above, among those made apparent from the preceding description, are efficiently attained and, since certain changes may be made in carrying out the above test procedures and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Electrical test apparatus for the functional testing of a digital logic, integrated circuit, field-effect transistor device having plural logic terminals and normally responding to binary signals applied to a first set of said terminals to develop one of two impedance levels at each terminal of a second set thereof, said test apparatus comprising
   A. digital source means for applying a set of binary input signals in parallel to said first set of terminals, and for applying sets of such signals in succession at a first rate,
   B. output means
      1. connected with terminals of said second set thereof,
      2. presenting to each terminal of said second set an impedance having a resistive component with a maximum value at least one order of magnitude less than the larger of said impedance levels which the device under test normally develops at that terminal and with an RC time constant not greater than the reciprocal of said first rate, and
      3. responding to the currents which the device under test develops at said terminals of said second set in response to each set of said input signals to produce further binary signals, and
   C. test output means connected with said source means and with said output means and producing a test output signal responsive to a comparison of the logic of said input signals with the logic of the signals said output means produces in response to said currents.

2. Electrical test apparatus as defined in claim 1 further characterized in that said resistive impedance component which said output means presents to each terminal of said second set has a maximum value at least two orders of magnitude less than the larger of said impedance levels which the device under test normally develops at that terminal.

3. Electrical test apparatus as defined in claim 1 further characterized in that said first rate at which said digital source means applies successive sets of said binary signals has a value of at least one megaHertz.

4. Electrical test apparatus for the functional testing of a digital logic, integrated circuit, field-effect transistor device having plural logic terminals and normally responding to binary signals applied to a first set of said terminals to develop binary signals at a second set of said terminals, said device normally developing one of two impedance levels at each terminal of said second set thereof in correspondence with the value of said binary signal it develops there, said test apparatus comprising A. digital source means for applying a set of binary input signals in parallel to said first set of terminals, and for applying successive sets of such signals at a first rate, B. means forming a common return conductor in circuit between said device under test and said apparatus, C. a plurality of further terminals, each of which is associated with a different terminal of said second set thereof, D. a plurality of electrical conductor means, each of which is connected between a different terminal of said second set thereof and the associated further terminal, and each of which has a shunt capacitance to said return conductor with a magnitude less than the period corresponding to said rate divided by one-tenth of the larger of said impedance levels which the device under test normally develops at the terminal of said second set connected thereto, E. output means
  1. connected with said further terminals,
  2. presenting to each further terminal a resistive impedance having a maximum value at least one order of magnitude less than the larger of said impedance levels which the device under test normally develops at the terminal of said second set which is connected to that further terminal,
  3. responding to the current which the device under test develops at each further terminal through the interconnecting conductor means, in response to each set of said input signals, to produce a binary signal; and F. test output means connected with said source means and with said output means and producing a test output signal in response to a comparison of the logic of said input signal with the logic of the signals said output means produces in response to said currents.

5. Electrical test apparatus as defined in claim 4 further characterized in that A. said resistive impedance which said output means presents to each said further terminal has a maximum value at least two orders of magnitude less than the larger of said impedance levels which the device under test normally develops at the terminal of said second set which is connected to that further terminal, and B. in which each shunt capacitance between each said conductor means and said return conductor has a magnitude less than the period corresponding to said rate divided by one-one hundredth of the larger of said impedance levels which the device under test normally develops at the terminal of said second set connected to that conductor means.

6. Electrical test apparatus for the functional testing of an electronic digital logic, metal-oxide, field-effect transistor device having plural logic terminals and normally responding to binary-valued logic signals applied to a first set of said terminals to develop binary-valued signals at a second set of said terminals, said test apparatus comprising A. digital source means for producing plural sets of parallel binary input signals in succession and for applying them to said first terminals of the device under test, B. output means connected wtih the terminals of said second set thereof and responsive to the currents the device under test develops at said terminals of said second set in response to each set of said input signals, and C. test output means connected with said source means and with said output means and producing a test output signal responsive to a comparison of the binary logic of said input signals with the binary logic of the currents the device under test develops in response thereto at said terminals of said second set.

7. Test apparatus as defined in claim 6 in which said output means applies an impedance to each terminal in said second set thereof with a resistive component having a value at least one order of magnitude less than the maximum impedance the device under test normally develops at that second-set terminal thereof.

8. Test apparatus as defined in claim 6 in which said output means presents an impedance to each terminal in said second set thereof with a resistive component having a value at least one order of magnitude less than the maximum impedance which the device under test normally develops at that second-set terminal thereof, and in which said output means applies to each terminal in said second set thereof an electrical analog signal of selected voltage level and current value.

9. Test apparatus as defined in claim 6

A. in which said test output means has 1. plural resistive elements, each for connection in circuit with the current the device under test produces at a different terminal of said second set thereof, and each with a value at least two orders of magnitude less than the maximum impedance the device under test normally develops at that terminal, and
  2. plural electronic amplifier means, each of which receives as an input signal the voltage across a different one of said resistive elements for producing said binary signal in response thereto, B. further comprising electrical supply means connected with each said resistive elements and for applying thereto an electrical analog signal of selected value in at least one of the current value and the voltage value thereof.

10. Test apparatus as defined in claim 6 in which said source means comprises

A. plural register means, each having a number of successively-ordered binary digit-storage stages, B. commutator means associated with each register means and for applying the digit stored in each of a number of successively-ordered stages of said associated register to a terminal of said first set in successive cycles occurring at a first rate, and C. counting means for operating each commutator means for a selected number of cycles greater than the number of stages in the associated register means.

11. A method for testing electronic digital logic, integrated circuit, field-effect transistor devices having plural logic terminals and normally responding to binary signals applied to a first set of said terminals to develop binary signals at a second set of said terminals, said device normally developing one of two impedance levels at each terminal of said second set thereof in correspondence with the value of said binary signal it develops there, said method comprising the successive steps of A. applying successive sets of parallel binary input signals to said first set of terminals of the device under test at a first rate,
B. sensing the magnitude of the current the device under test develops at each of said terminals of said second set thereof in response to each said set of input signals,
C. producing a binary test signal in response to the current sensed at each said second-set terminal,
D. comparing the logic of said input signals of each set thereof with the logic of said test signals resulting therefrom to produce a test output signal.

12. A method as defined in claim 11 in which said sensing step further includes

A. presenting to each terminal of said second set thereof an impedance having a resistive component with a maximum value at least one order of magnitude less than the larger impedance level the device under test normally develops at that terminal, and
B. sensing the magnitudes of the currents the device under test develops in said resistive impedance components.

13. A method as defined in claim 12 in which said sensing step further includes presenting each impedance with an RC time constant, computed with the resistance of said resistive component, not greater than the reciprocal of said first rate.

14. A method as defined in claim 11 in which said step of applying input signals further comprises, for each said first-set terminal, A. assembling a word of successively-ordered binary digits,
B. applying each of a selected number of successively ordered bits of said word to that terminal in successive cycles, occurring at said first rate, and
C. repeating said bit-applying step for a selected number of cycles greater than the number of digits in said word.

* * * * *

UNITED STATES PATENT OFFICE
CERTIFICATE OF CORRECTION

Patent No. 3,772,595　　　　　　　　Dated November 13, 1973

Inventor(s) Nicholas DeWolf and John G. Turner

It is certified that error appears in the above-identified patent and that said Letters Patent are hereby corrected as shown below:

On the first page of the patent, the addresses of the inventors have been reversed and should read as follows:

--Inventors:　Nicholas DeWolf, Boston, Mass.;

John G. Turner, Kingston, Surrey

England--.

Column 1, line 12, change "metnod" to --method--.

Column 3, line 26, change "is" to --been--.

Column 5, line 37, change "nest" to --next--.

Column 14, line 33, a new subparagraph should begin with "1. plural resistive elements".

Signed and sealed this 6th day of August 1974.

(SEAL)
Attest:

McCOY M. GIBSON, JR.　　　　　　　C. MARSHALL DANN
Attesting Officer　　　　　　　　　Commissioner of Patents